Patented May 17, 1938

2,117,730

UNITED STATES PATENT OFFICE 2,117,730

HIGH-MOLECULAR ORGANIC COMPOUNDS

Karl Koeberle and Otto Schlichting, Ludwigshafen-on-the-Rhine, Germany, assignors to General Aniline Works, Inc., New York, N. Y., a corporation of Delaware No Drawing. Application November 11, 1936, Serial No. 110,280. In Germany February 7, 1936

4 Claims. (Cl. 260—128)

The present invention relates to high molecular organic compounds.

We have found that high-molecular compounds of the general formula $R—(A—X)_n$ in which R is the radical of a hydrocarbon having 3 condensed rings and X is an aliphatic radical having at least 4 carbon atoms and $n$ a whole number up to 2 and wherein A stands for —O—, —S—, —Se—, —NH— or —N— alkyl, and in which the radical R may contain any further atoms or atomic groups, especially further alkyl groups which may be combined in any desired manner, are distinguished by very valuable properties which render them suitable for many industrial purposes.

The said new compounds may be prepared, for example, by reacting compounds containing the radical of a hydrocarbon having 3 condensed rings with aliphatic compounds having at least 4 carbon atoms, the starting substances being so chosen that either contains at least one hydrogen or metal atom combined with oxygen, sulphur, selenium or nitrogen, and the other an atom or an atomic group which allows to replace the said reactive hydrogen or metal atom by the radical of the first mentioned starting compound. More particularly speaking, compounds containing a radical R and atoms or groups capable of being exchanged such as halogen atoms or hydroxyl, alkoxy, nitro or sulphonic acid groups may be reacted with hydroxy, mercapto, seleno, amino or alkylamino derivatives of aliphatic compounds having at least 4 carbon atoms. These aliphatic compounds may also be employed in the form of their salts. Furthermore hydroxy, mercapto, seleno, amino or alkylamino compounds of hydrocarbons containing 3 condensed rings may be reacted with halogen, hydroxy, alkoxy or nitro compounds of the aliphatic series containing at least 4 carbon atoms. These compounds may also be employed in some cases in the form of their salts. Sometimes it may be of advantage to carry out the preparation of the compounds containing exchangeable atoms or groups serving as starting materials and the conversion of these compounds into the compounds of the present process in one operation.

Another method for preparing the said compounds consists in starting from compounds of the general formula R'AX, wherein R' is the radical of a hydrocarbon containing up to 2 condensed rings, and in linking on hydrocarbon rings to the said radical R' until it is converted into the radical of a hydrocarbon containing 3 condensed rings.

Compounds of the kind defined above may also be obtained by reducing compounds of the general composition R''.A.X, in which R'' is the radical of a carbocyclic compound having 3 condensed rings capable of being reduced. Thus, for example, anthraquinones, azanthraquinones or phenanthrenequinones which already contain a radical of the composition —A.X, may be converted into compounds of the general formula R.A.X by treating them with zinc dust or sodium hydrosulphite in an alkaline medium, or with stannous chloride in the presence of hydrochloric acid, or with hydrogen iodide, or by treating them with hydrogen under superatmospheric pressure in the presence of hydrogenating catalysts. If desired, this procedure may be combined with the preparation of the starting substances. The reactions are, generally speaking, carried out without the use of a diluent, in some cases, however, it may be useful to employ a suitable solvent or diluent, for example in cases in which one of the starting compounds is comparatively unstable or in which the reactions proceed very rapidly. In some cases the reaction may be carried out with advantage in a closed vessel under superatmospheric pressure.

The reaction products are generally obtained in a good yield and in a good state of purity. If necessary, they may be purified according to the usual methods, for example, by recrystallization, sublimation or redissolution from suitable solvents or by boiling them with solvents or by reprecipitation in stages. They may be employed for most various industrial purposes. They are readily soluble in organic solvents and are distinguished by valuable fastness properties and are in general colored compounds and show often a brilliant fluorescence. They have in part affinity to textile fibres and may therefore be employed as dyestuffs or for the preparation of dyestuffs. Furthermore they may be used for coloring and/or imparting fluorescence to hydrocarbons, rubber or other plastic masses of natural or artificial origin, oils, such as vegetable or mineral oils, especially lubricating oils, fats, waxes and the like.

The following examples will further illustrate how our said invention may be performed and carried out in practice, but we do not wish to limit ourselves to the said examples. The parts are by weight.

*Example 1*

A mixture of 20 parts of 2-hydroxyanthracene and 40 parts of octodecylamine is heated at about 240° C. while stirring, until initial material is no longer present. Any excess of octodecylamine is removed by distillation under reduced pressure.

2-octodecylaminoanthracene is thus obtained in a form of a yellow powder which dissolves in concentrated sulphuric acid giving a yellow coloration and a powerful green fluorescence. It dissolves in organic solvents giving a yellow coloration and a blue to green fluorescence, depending on the kind of the solvent. In a corresponding manner 1-hydroxyanthracene may be converted into 1-octodecylaminoanthracene, and 1-hydroxy-4-methoxy or 1,4-dihydroxyanthracene may be converted into 1,4-di-octodecylaminoanthracene. These compounds may also be prepared by treating in octodecylaminoanthraquinone with agents having a powerful reducing action.

Instead of octodecylamine other aliphatic amines having at least 4 carbon atoms may be used such as hexylamine, nonylamine, decylamine, myristylamine or octodecylamine either alone or in admixture with each other. For example, the alkylamines corresponding to the fatty acids contained in palm kernel oil may be caused to react with 2-hydroxyanthracene in the manner described above.

*Example 2*

25 parts of 1,5-dibutylaminoanthraquinone (obtainable by reacting 1,5-dichloranthraquinone with butylamine under superatmospheric pressure) are dissolved in 75 per cent sulphonic acid. The solution is poured into water and the said precipitate is filtered off by suction, washed with water and suspended in 500 parts of water. After the addition of 50 parts of caustic soda, 20 parts of zinc dust and 20 parts of sodium hydrosulphite, the solution is heated at from 90° to 95° C. until a sample withdrawn of the product is free from oxygen. The mixture is then allowed to cool and the residue is freed from any inorganic compounds. The 1,5-dibutylaminoanthracene thus obtained is a yellow powder which dissolves in organic solvents giving a yellow coloration and an intensely green fluoresence.

Instead of 1,5-dibutylaminoanthraquinone its derivatives may be employed as starting substances as for example 1,5-dibutylamino-2,6-dimethylanthraquinone or 1,5-dibutylamino-2,6-dichloranthraquinone. In a corresponding manner other alkylaminoanthraquinones or derivatives of anthrone and dianthrone may be converted by means of reducing agents into the corresponding derivatives of anthracene. For example by treating 1-dodecyl-4-hexylaminoanthraquinone with zinc dust in an alkaline medium in the manner described above 1-dodecyl-4-hexylaminoanthracene is obtained. In a corresponding manner the dodecyl ethers or thioethers or seleno ethers of anthracene may be prepared by reducing the corresponding anthraquinone derivatives.

*Example 3*

A mixture of 200 parts of 3-hydroxyphenanthrene and 300 parts of octodecenylamine is heated until any unchanged hydroxy compound is no longer present. The mixture is then allowed to cool and worked up in the usual manner. The 3-octodecenylamino-phenanthrene thus obtained is a slightly yellow powder which dissolves in organic solvents, especially in those free from hydroxyl groups, giving a blue fluorescence.

Instead of 3 hydroxyphenanthrene other hydroxyphenanthrenes and instead of the said amine other primary or secondary amines such as butanolamine, nonylamine, dibutylamine, methylhexylamine, isohexylamine or octodecylamine may be employed.

By treating the 3-hydroxyphenanthrene with dodecylbromide in an alkaline medium the corresponding dodecyl ether is obtained. Similarly mercapto or selenophenanthrene may be reacted with high-molecular amines as mentioned hereinbefore, such as dodecylamine or octodecylamine giving the corresponding mercapto or selenophenanthrenes, respectively, containing the radical of the amine employed combined by means of sulphur or selenium, with the nucleus of phenanthrene. By reacting hydroxy derivatives of fluorene with primary amines of the fatty series the corresponding alkylaminofluorenes are obtained.

What we claim is:—

1. A high-molecular compound of the general formula

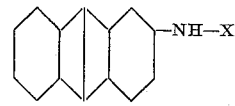

in which X is the radical of an aliphatic hydrocarbon having at least 4 carbon atoms.

2. The anthracene derivative having the formula

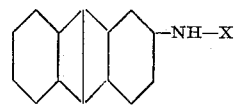

in which X stands for the radical of an alkyl corresponding to the fatty acids contained in palm kernel oil.

3. The anthracene derivative having the formula

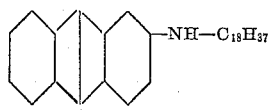

4. The anthracene derivative having the formula

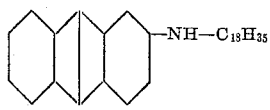

KARL KOEBERLE.
OTTO SCHLICHTING.